United States Patent [19]
Davidson et al.

[11] Patent Number: 5,559,884
[45] Date of Patent: Sep. 24, 1996

[54] METHOD AND SYSTEM FOR GENERATING AND AUDITING A SIGNATURE FOR A COMPUTER PROGRAM

[75] Inventors: Robert I. Davidson; Nathan Myhrvold, both of Bellevue, Wash.

[73] Assignee: Microsoft Corporation, Redmond, Wash.

[21] Appl. No.: 268,967

[22] Filed: Jun. 30, 1994

[51] Int. Cl.⁶ ........................................ G06F 9/42
[52] U.S. Cl. .......................... 380/4; 380/25; 364/DIG. 1; 364/262.5; 371/22.4
[58] Field of Search .................. 380/3, 4.25; 364/262.5; 371/22.4

[56] References Cited

U.S. PATENT DOCUMENTS

| | | | |
|---|---|---|---|
| 4,120,030 | 10/1978 | Johnstone | 364/200 |
| 4,633,388 | 12/1986 | Chiu | 364/200 |
| 4,646,234 | 2/1987 | Tolman et al. | 380/4 X |
| 5,097,504 | 3/1992 | Camion et al. | 380/23 |
| 5,212,794 | 5/1993 | Pettis et al. | 364/262.5 |
| 5,442,645 | 8/1995 | Ugon et al. | 371/22.4 |

Primary Examiner—Gilberto Barrón, Jr.
Attorney, Agent, or Firm—Seed and Berry LLP

[57] ABSTRACT

A method and system for generating and auditing a signature for executable modules are provided. A signature is a means that uniquely identifies an authorized copy of the executable module. The signature of each authorized copy is encoded within the order of instructions of the executable module. Each executable module is made up of multiple blocks of instructions. To place a signature within the executable module, a group of blocks having a flow of execution is selected from the executable module. The group of blocks is then reordered to form a signature for the executable module. To ensure that the reordered group of blocks has the same flow of execution, the blocks within the reordered group of blocks are modified to maintain the flow of execution. The reordered group of modified blocks replaces the unmodified group of blocks within the authorized copy of the executable module. The modified copy of the executable module executes in a manner that is functionally equivalent to the unmodified executable module. However, the reordered blocks provide a signature that is unique to each authorized copy. By inspecting the order of the group of blocks in a copy of the executable module, the signature can be determined, and thus it can be determined from which authorized copy the executable module derives.

26 Claims, 6 Drawing Sheets

METHOD AND SYSTEM FOR GENERATING AND AUDITING A SIGNATURE FOR A COMPUTER PROGRAM

TECHNICAL FIELD

This invention relates generally to a method of and system for identifying unauthorized copies of a computer program, and particularly to a method of and system for encoding a signature into a computer program and auditing a computer program to determine its encoded signature.

BACKGROUND OF THE INVENTION

Computer programs are typically sold in the form of executable modules. An executable module contains instructions that have been compiled and translated into machine code so that they can be loaded into memory and executed. After software manufacturers create an executable module, they make multiple copies of the executable module and then sell the copies to purchasers. While making the copies, software manufacturers typically insert a unique serial number at a predetermined location within each copy of the executable module. The serial number is a unit of data that distinguishes each copy of the executable module. If a subsequent copy is made of the purchased copy, the subsequent copy should bear the same serial number as the purchased copy.

When a purchaser purchases a copy of the executable module, the purchaser's name and the serial number of the purchased copy are typically registered with the software manufacturer. This registration may be accomplished by the purchaser submitting a registration form to the software manufacturer or, in some instances, the software manufacturer or a retail vendor recording the necessary information at the time of purchase. By associating a serial number with each purchaser, software manufacturers hope to deter unauthorized copying. By comparing the serial number of a copy in question with the software manufacturer's list of recorded serial numbers, the software manufacturer may determine whether the copy in question is an authorized copy. If the software manufacturer determines that the copy in question is an unauthorized copy, the serial number within the unauthorized copy may indicate from which authorized copy the unauthorized copy was derived.

Unfortunately, the purchaser (or someone who has access to the authorized copy) may easily remove or alter the serial number, make multiple unauthorized copies, and then distribute or even sell the unauthorized copies to third parties. The software manufacturer is able to identify such copies as unauthorized, but, without a valid serial number to rely on, the software manufacturer is unable to determine the origin of the unauthorized copies. Similarly, when a purchaser fails to register the serial number of a purchased copy with the software manufacturer, the software manufacturer may later be unable to determine whether the serial number of the purchased copy has been altered.

Software manufacturers require a method of including a serial number or other identifying mark within a copy of an executable module in such a way that the serial number or identifying mark cannot be easily removed or altered. Additionally, software manufacturers require a method of analyzing a copy of an executable module to determine its serial number or identifying mark.

SUMMARY OF THE INVENTION

The present invention provides a method and system for generating and auditing a signature for an executable module. A signature is similar to a serial number in that it uniquely identifies each copy of the executable module, but different in that a signature is an intrinsic part of the executable module program rather than an extrinsic data item. As an intrinsic part of the executable module, a signature cannot easily be removed or altered without affecting the performance of the executable module. Each executable module is made up of multiple code portions such as functions or basic blocks. In a preferred embodiment, the present invention creates a signature for an executable module by selecting a group of code portions from the multiple code portions that make up the computer program and then reordering the selected code portions. The new placement order of the selected code portions within the computer program forms the signature for the computer program. To ensure that each signed copy of the computer program executes in a manner that is functionally equivalent to the original computer program, the present invention causes modifications to be made to certain code portions to preserve the original flow of execution. The present invention audits a copy of an executable module to identify the signature for the copy by inspecting the placement order of a selected group of code portions within the copy. Once the signature is identified, the origin of the copy can be determined.

DETAILED DESCRIPTION OF THE INVENTION

In a preferred embodiment, the present invention provides a method and system for generating and auditing a signature for an executable module. A signature is similar to a serial number in that it uniquely identifies each copy of the executable module, but different in that a signature is an intrinsic part of the executable module rather than an extrinsic data item. As an intrinsic part of the executable module, a signature cannot easily be removed or altered without affecting the performance of the executable module. Each executable module is made up of multiple code portions such as functions or basic blocks. The present invention creates a signature for an executable module by selecting a group of code portions and then reordering the selected code portions without altering the flow of execution of the executable module. The new placement order of the selected code portions within the executable module forms the signature for the executable module. To ensure that all of the signed copies of the executable module, that is, all of the copies that have a signature, have the exact same flow of execution, the present invention causes modifications to be made to code portions when necessary to preserve the flow of execution.

The present invention audits a copy of an executable module to identify the signature for the copy by inspecting the placement order of a selected group of code portions within the copy. Once the signature is identified, the origin of the copy can be determined.

For purposes of this detailed description, the term "executable module" includes any program or library of routines capable of executing on a computer system. "Placement order" refers to the order in which code portions are located within the executable module, for example, first, second, third, and so on.

In one embodiment of the present invention, a code portion is a basic block of instructions. A basic block is a sequence of instructions with one entrance and one exit. The first instruction in the block is the entrance to the block and the last instruction is the exit. The instructions within a block are executed in sequence, that is, no branches occur within the block. The exit instruction of a block can be static, for example, a jump or fall through to another block, or dynamic, for example, an indirect jump to another block. While many known methods exist for identifying basic blocks, one such method is described in the patent application entitled "METHOD AND SYSTEM FOR IMPROVING THE LOCALITY OF MEMORY REFERENCES DURING EXECUTION OF A COMPUTER PROGRAM", which is filed concurrently herewith.

Figure 1:
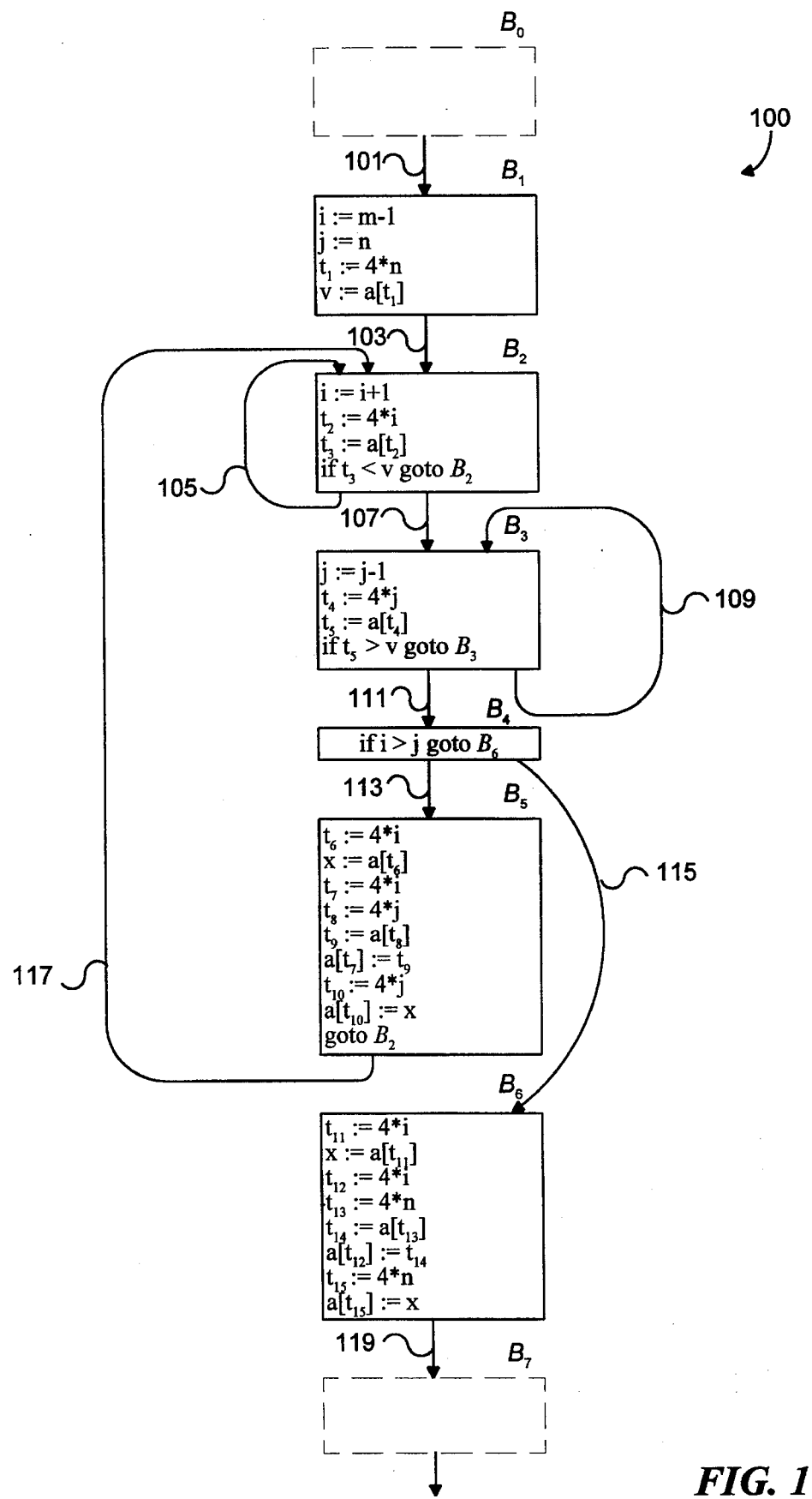
FIG. 1 is a block diagram of a control flow graph for selected blocks.

A control flow graph is a well-known structure for representing the flow of execution between basic blocks. In a control flow graph, each node represents one block, and nodes are connected to other nodes by directed edges. For example, a directed edge connects a block B1 to a block B2 if block B2 immediately follows block B1 in some execution sequence. In other words, there is a directed edge from block B1 to block B2 if there is a conditional or unconditional jump from the exit instruction of block B1 to the entrance instruction of block B2, or if block B2 immediately follows block B1 in the order of the program and the exit instruction of block B1 is not an unconditional jump instruction. FIG. 1 is a block diagram of a control flow graph 100 for selected blocks. The instructions that make up the selected blocks are listed below in Table A.

TABLE A

| | |
|---|---|
| (1) i:= m−1 | (16) $t_7$:= 4*i |
| (2) j:= n | (17) $t_8$:= 4*j |
| (3) $t_1$:= 4*n | (18) $t_9$:= a[$t_8$] |
| (4) v:= a[$t_1$] | (19) a[$t_7$]:= $t_9$ |
| (5) i:= i+1 | (20) $t_{10}$:= 4*j |
| (6) $t_2$:= 4*i | (21) a[$t_{10}$]:= x |
| (7) $t_3$:= a[$t_2$] | (22) goto (5) |
| (8) if $t_3$ < v goto (5) | (23) $t_{11}$:= 4*i |
| (9) j:= j−1 | (24) x:= a[$t_{11}$] |
| (10) $t_4$:= 4*j | (25) $t_{12}$:= 4*i |
| (11) $t_5$:= a[$t_4$] | (26) $t_{13}$:= 4*n |
| (12) if $t_5$ > v goto (9) | (27) $t_{14}$:= a[$t_{13}$] |
| (13) if i >= j goto (23) | (28) a[$t_{12}$]:= $t_{14}$ |
| (14) $t_6$:= 4*i | (29) $t_{15}$:= 4*n |
| (15) x:= a[$t_6$] | (30) a[$t_{15}$]:= x |

Referring to Table A, a first block includes instructions on lines (1)–(4). The instruction on line (5) begins a second block because a jump to line (5) is located in the instruction on line (8). Similarly, the instruction on line (9) begins a third block because it follows a jump instruction on line (8).

The control flow graph 100 shown in FIG. 1 comprises eight blocks—$B_0$, $B_1$, $B_2$, $B_3$, $B_4$, $B_5$, $B_6$ and $B_7$. Blocks $B_1$–$B_6$ represent the instructions shown above in Table A. Blocks $B_0$ and $B_7$ are shown to illustrate that blocks $B_1$–$B_6$ were selected from a larger sequence of blocks. All conditional and unconditional jumps to instructions in Table A have been replaced in the control flow graph 100 by jumps to the block of which the instructions are entrance instructions. For example, the instruction "goto (5)" on line (22) in Table A has been replaced by "goto $B_2$" at the end of block $B_5$ in FIG. 1. When these blocks are loaded into the main memory device 18, the block names "$B_1$," "$B_2$," and so on, within each instruction, are replaced by physical addresses.

Referring to the control flow graph 100 of FIG. 1, the fall through or jump from the exit instruction in block $B_0$ to the entrance instruction in block $B_1$ is represented by edge 101. The fall through from the exit instruction of block $B_1$ to the entrance instruction of block $B_2$ is represented by edge 103. The jump from the exit instruction of block $B_2$ to the entrance instruction of block $B_2$ is represented by edge 105. The fall through from the exit instruction of block $B_2$ to the entrance instruction of block $B_3$ is represented by edge 107. The jump from the exit instruction of block $B_3$ to the entrance instruction of block $B_3$ is represented by edge 109. The fall through from the exit instruction of block $B_3$ to the entrance instruction of block $B_4$ is represented by edge 111. The jump from the exit instruction of block $B_4$ to the entrance instruction of block $B_6$ is represented by edge 115. The fall through from the exit instruction of block $B_4$ to the entrance instruction of block $B_5$ is represented by edge 113. The jump from the exit instruction of block $B_5$ to the entrance instruction of block $B_2$ is represented by edge 117. The fall through from the exit instruction of block $B_6$ to the entrance instruction of block $B_7$ is represented by edge 119.

Figure 2:
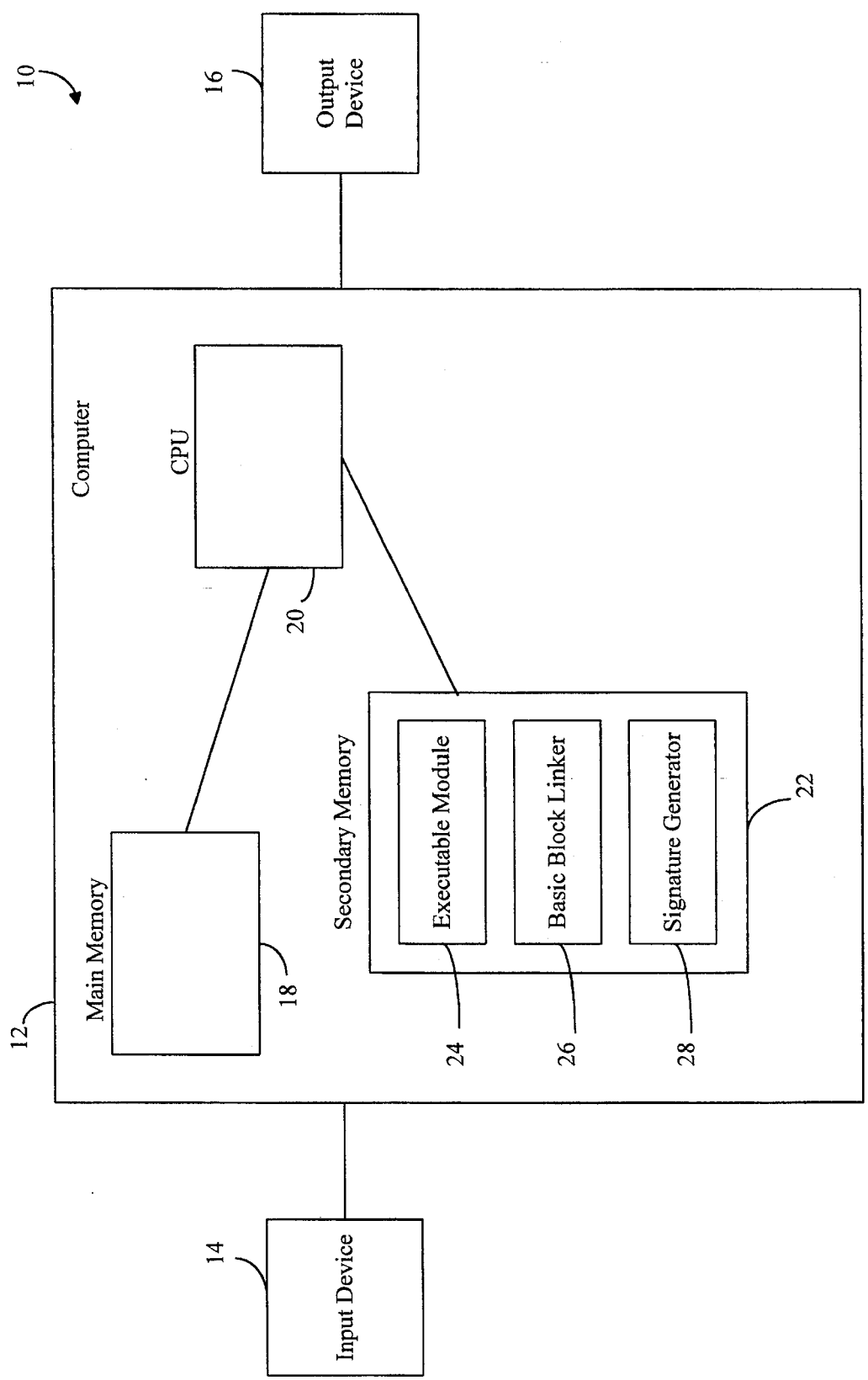
FIG. 2 is a block diagram of a computer system configured to implement a preferred embodiment of the present invention.

FIG. 2 is a block diagram of a computer system 10 configured to implement a preferred embodiment of the present invention. The computer system 10 includes a computer 12, an input device 14 such as a keyboard, and an output device 16 such as a display screen. The computer 12 includes a main memory 18, a central processing unit ("CPU") 20, and a secondary memory 22. An executable module 24, a basic block linker program 26, and a signature generator 28 are stored on the secondary memory 22. The executable module 24 includes multiple basic blocks that have been compiled and linked so that they are ready to execute on the computer 12. When executed, the basic block linker program 215 and the signature generator 28 are copied into the main memory 18. The basic block linker program 26 and the signature generator 28 will be described in more detail below.

Figure 3:
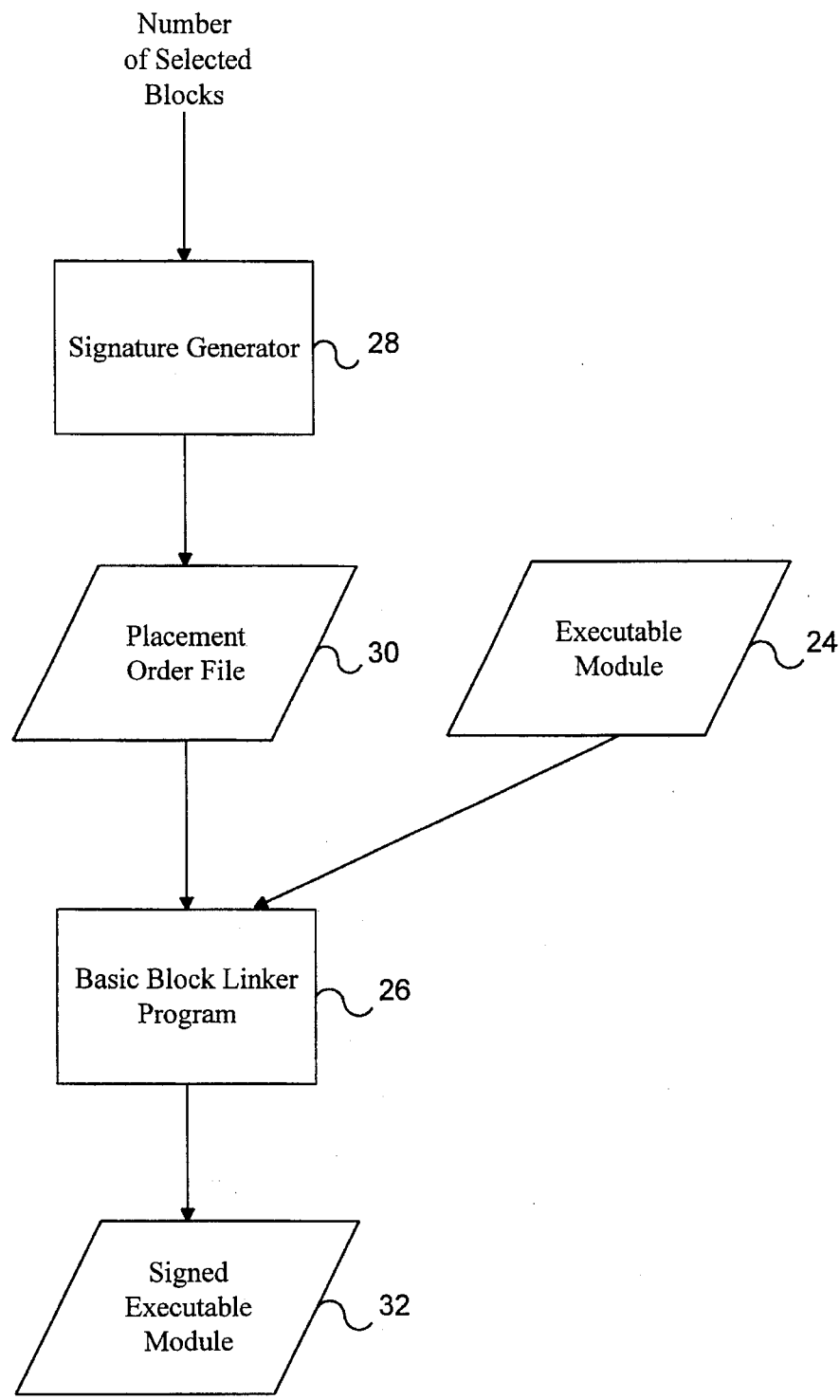
FIG. 3 is a data flow diagram for generating a signature for an executable module stored in the computer system of FIG. 2 in accordance with a preferred embodiment of the present invention.

FIG. 3 is a data flow diagram for generating a signature for the executable module 24 in accordance with a preferred embodiment of the present invention. Multiple blocks are selected from within the executable module 24 to represent the signature. The number of blocks selected depends upon the range of signature values needed. For example, if n blocks are selected to represent the signature, there are n! possible unique sequences in which the n blocks can be ordered. For example, if ten blocks are selected, then there are 10!, or 3,628,800, possible unique sequences in which the ten blocks can be ordered. This means that 3,628,800 different executable modules can be given a unique signature by rearranging the order of the ten selected blocks.

The number of blocks selected is then input into the signature generator 28. Given the number of blocks selected, the signature generator 28 generates a unique sequence of placement orders and stores the new placement orders in a placement order file 30. For example, if three blocks, B1, B2, and B3 are selected, then the signature generator 28 generates one of the following six placement orders:

| first | second | third |
|-------|--------|-------|
| B1    | B2     | B3    |
| B1    | B3     | B2    |
| B2    | B1     | B3    |
| B2    | B3     | B1    |
| B3    | B1     | B2    |
| B3    | B2     | B1    |

A routine similar to a random number generator may be used to generate the new placement orders as long as each new sequence of placement orders is unique. The new sequence of placement orders is stored in a placement order file 30.

Figure 4:
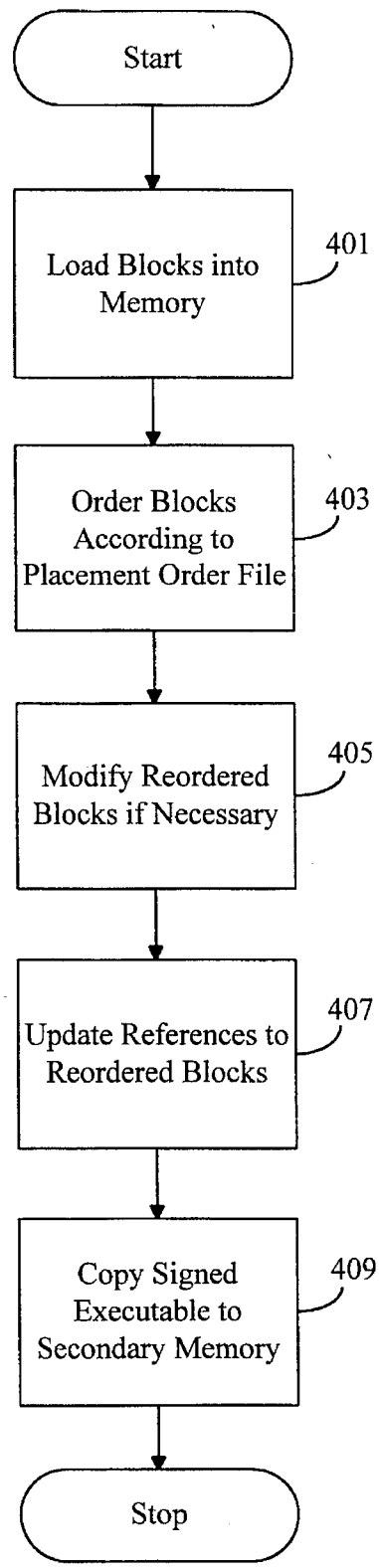
FIG. 4 is an overview flow diagram of a process used to link selected blocks according to a determined placement order.

The basic block linker ("BBLinker") program 26 re-links the code portions within the executable module 24 according to the new sequence of placement orders stored in the placement order file 30, and then and stores the resulting code in a "signed" executable module 32. FIG. 4 is an overview flow diagram of this re-linking process. In step 401, the BBLinker program loads all of the basic blocks in the executable module 24 into memory. In step 403, the BBLinker program orders the blocks according to the placement order defined in the placement order file 30. At this time, the 5BBLinker also notes the new address of each block. In step 405, the BBLinker reviews the exit instruction of each block to determine if modifications are required to reflect the new address of each basic block, and, if modification are required, makes the necessary modifications. In step 407, the BBLinker modifies any references to the signature blocks to reflect the new ordering. In step 409, the BBLinker program copies the signed executable module 32 to secondary memory 22.

Figure 5:
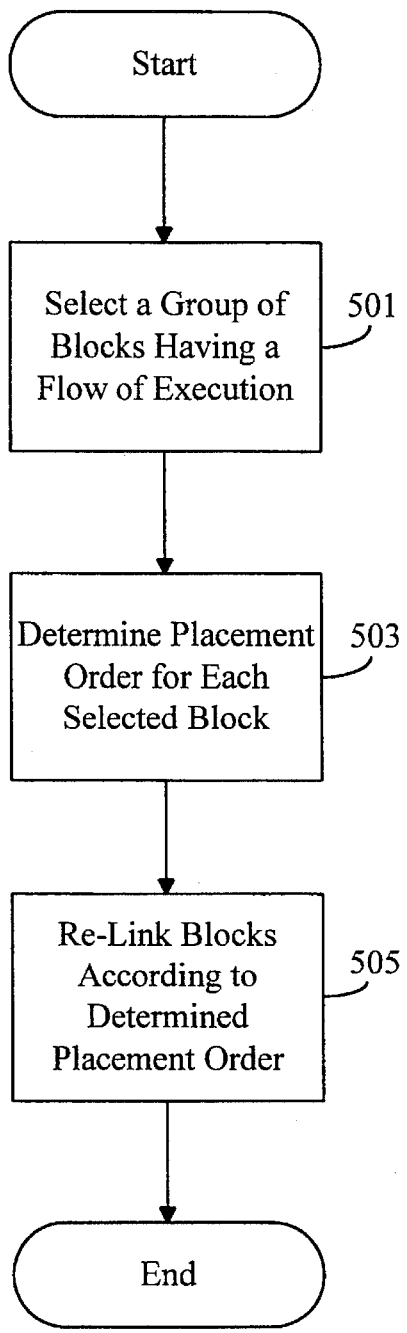
FIG. 5 is an overview flow diagram of a method used to generate a signature for the executable module stored in the computer system of FIG. 2 in accordance with a preferred embodiment of the present invention.

FIG. 5 is an overview flow diagram of a method used by the signature generator 28 to generate a signature for the executable module 24 in accordance with a preferred embodiment of the present invention. As discussed previously, the executable module 24 is made up of multiple basic blocks or other code portions. In step 501, the signature generator 28 selects a group of blocks having a flow of execution to represent the signature for the executable module 24. While the group of blocks may be either contiguous or non-contiguous, this description will treat the group of blocks as if they are contiguous. In a preferred embodiment, blocks are selected on the basis that their removal would affect the execution of the executable module 24. This can be accomplished by selecting blocks that are part of a main or often-executed routine.

In step 503, the signature generator 28 determines a placement order for each of the selected blocks. When determining the placement order, a routine similar to a random number generator may be used to generate random sequences. Of course, each placement order should be unique. Assuming blocks $B_1$, $B_2$, $B_3$, $B_4$, $B_5$, and $B_6$ of the control flow graph 100 of FIG. 2 are selected by the signature generator 28 to be signature blocks, these blocks can be ordered 6! or 720 different ways. One such possible ordering is $B_5$-$B_2$-$B_1$-$B_6$-$B_3$-$B_4$.

In step 505, the signature generator 28 causes the blocks that make up the executable module 24 to be re-linked by the BBLinker program 26 to produce the signed executable module 32. The BBLinker program 26 places blocks into the signed executable module 32 according to the new placement orders stored in the placement order file 30 by the signature generator 28. When placing the blocks into the signed executable module 32, the BBLinker program 26 modifies blocks by editing or deleting existing branching instructions or by adding new branching instructions to maintain the flow of execution of the executable module 24.

Figure 6:
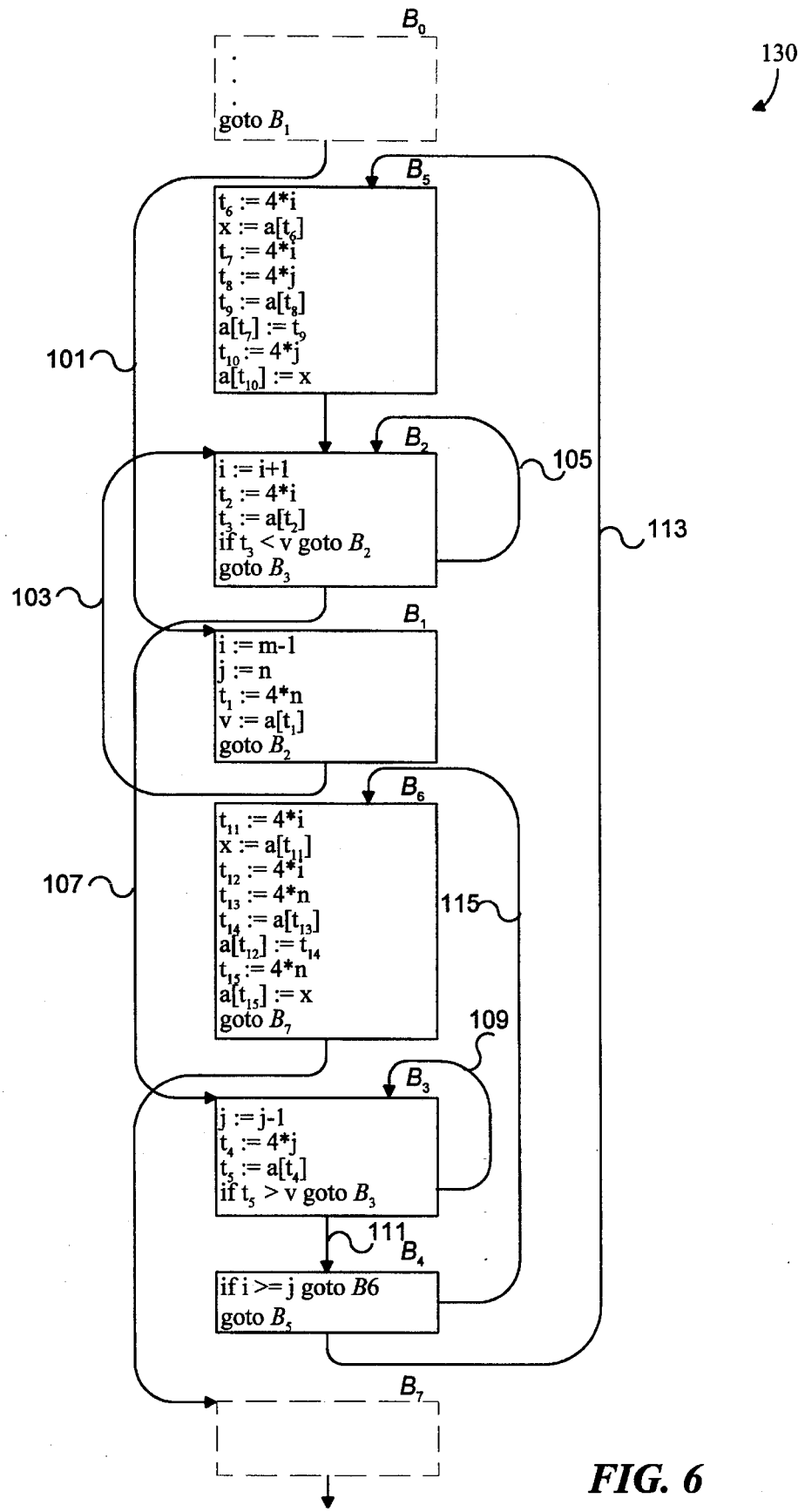
FIG. 6 is a control flow graph of the selected blocks of FIG. 1 ordered according to the determined placement order.

FIG. 6 is a control flow graph 130 of the selected group of blocks ordered within the signed executable module 32 according to the newly determined placement order $B_0$-$B_5$-$B_2$-$B_1$-$B_6$-$B_3$-$B_4$-$B_7$. Once again, blocks $B_0$ and $B_7$ are shown to illustrate that the selected blocks are typically part of a larger group of blocks. To maintain the flow of execution illustrated in the control flow graph 100 of FIG. 1, the BBLinker program 26 modifies the exit instructions of blocks $B_0$, $B_1$, $B_2$, $B_3$, $B_4$, $B_5$, and $B_6$. Exit instructions are modified to reflect the new locations of the blocks. Also, instructions are added to the end of blocks that used to fall through to the next block, but now require a jump instruction to maintain the "fall through." For example, a jump instruction, "goto $B_1$," was added as an exit instruction to block $B_0$ so that the instructions in block $B_1$ will be executed following the instructions in block $B_0$. A jump instructions, "goto $B_2$," was added as an exit instruction to block $B_1$ so that the instructions in block $B_2$ will be executed following the instructions in block $B_1$. A jump instruction, "goto $B_3$," was added as an exit instruction to block $B_2$ so that the instructions in block $B_3$ will be executed following the instructions in block $B_2$. No modifications were made to block $B_3$ because, according to the new placement order, the exit instruction of block $B_3$ falls through to the entrance instruction of block $B_4$. A jump instruction, "goto $B_5$," was added as an exit instruction to block $B_4$ so that the instructions in block $B_5$ will be executed following the instructions in block $B_4$. A jump instruction, "goto $B_2$," was removed from the end of block $B_5$. The jump instruction was removed because the new exit instruction of block $B_5$ falls through to the entrance instruction of block $B_2$ in the reordered group. No jump instruction is necessary to maintain the flow of execution. A jump instruction, "goto $B_7$," was added as an exit instruction to block $B_6$ so that the instructions in block $B_7$ will be executed following the instructions in block $B_6$. The amount of memory needed to store the selected blocks according to their new placement orders may be different than the amount of memory needed to originally store the selected blocks, requiring the instructions in block $B_7$ to be adjusted accordingly. Also, instructions that reference blocks $B_1$-$B_6$ from outside these blocks may also need to be adjusted.

The signature $B_5$-$B_2$-$B_1$-$B_6$-$B_3$-$B_4$, created by the above-described method, is an intrinsic part of the signed executable module and almost impossible to detect. Also, if the blocks that make up the signature are removed from the signed executable module, then the signed executable module will not execute properly.

The present invention audits a copy of an executable module to identify the signature for the copy by inspecting the placement order of a selected group of blocks within the copy. In one embodiment, the present invention inspects the placement order by identifying each block by its bit pattern, assuming each block is unique. Other methods of inspecting the placement order, such as placing a header in the data structure may be used. Once the signature is identified, the origin of the copy can be determined.

While various embodiments have been described in this application for illustrative purposes, the claims are not limited to the embodiments described herein. Equivalent devices or steps which operate according to principles of the present invention may be substituted for these described, and thus fall within the scope of the claims that follow. For example, any number of blocks, contiguous or non-contiguous, may be selected as signature blocks, and the selected blocks may be located at various positions within the executable module. Additionally, the above described methods may be used to place signatures in computer programs in various formats, including source code, compiled code, executable code, and so on.

We claim:

1. In a computer system, a method for encoding a signature in a plurality of copies of a computer program, the computer program having a plurality of code portions, the method comprising:

selecting a group of code portions having a flow of execution from among the plurality of code portions; and for each of the plurality of copies of the computer program;
   reordering the selected group of code portions to encode a signature into the copy of the computer program; and
   modifying the code portions within the reordered group of code portions in order to maintain the flow of execution, wherein each of the plurality of copies of the computer program is identifiable by its signature from other copies of the computer program.

2. The method according to claim 1 wherein the step of selecting a group of code portions includes selecting contiguous code portions.

3. The method according to claim 1 wherein the step of selecting a group of code portions includes selecting non-contiguous code portions.

4. The method according to claim 1 wherein the flow of execution is indicated by exit instructions within each code portion and wherein the step of modifying the code portions includes adding branching instructions to code portions to maintain the flow of execution.

5. The method according to claim 1 wherein the flow of execution is indicated by exit instructions within each code portion and wherein the step of modifying the code portions includes modifying the exit instructions to maintain the flow of execution.

6. The method according to claim 1 wherein the selecting step includes selecting a group of code portions from among the plurality of code portions, such that at least one of the code portions of the selected group is executed during each execution of the computer program.

7. The method according to claim 1 wherein the selecting step includes selecting a group of code portions from among the plurality of code portions, such that the computer will execute incorrectly on the computer system if the group of code portions is removed from the computer program.

8. In a computer system method for placing a signature in each of a plurality of copies of a computer program, the computer program having a plurality of code portions, the method comprising:

selecting a group of code portions having a flow of execution from among the plurality of code portions; and for each of the copies of the computer program,
   reordering the selected group of code portions to form the signature for the copy of the computer group by randomly selecting an order for the code portions and then reordering the group of code portions based upon the randomly selected order; and
   modifying the code portions within the reordered group of code portions in order to maintain the flow of execution, wherein each copy of the computer program is identifiable by its signature from the other copies of the computer program.

9. The method according to claim 8 including ensuring that each randomly selected order is unique.

10. In a computer system, a method for uniquely identifying each copy of a computer program, the computer program having a plurality of blocks, the method comprising:

selecting a group of signature blocks from among the plurality of blocks, the group of signature blocks having a flow of execution and an order; and for each copy of the computer program,
    adjusting the order of the group of signature blocks while maintaining the flow of execution to create a signature for the copy of the computer program; and
    storing the signature within the copy of the computer program so that the copy can be uniquely identified and so that, during execution of the copy, the signature blocks of the stored signature are executed.

11. The method according to claim 10 wherein the selecting step includes selecting two or more blocks from among the plurality of blocks such that the two or more blocks collectively form an essential part of the computer program.

12. The method according to claim 10 wherein the selecting step includes selecting two or more blocks from among the plurality of blocks so that the computer program will execute incorrectly on the computer system if the two or more blocks are removed from the computer program.

13. The method according to claim 10 wherein each block of the computer program has an exit instruction, and including, after the adjusting step, the step of modifying the exit instruction of each selected block to preserve the flow of execution of the two or more blocks.

14. The method according to claim 13 wherein the modifying step includes, when an exit instruction is a branching instruction that specifies an original target address, determining a new target address based on the adjusted order and substituting the new target address for the original target address in the branching instruction.

15. In a computer system, a method for determining a signature for a signed copy of a computer program, the signature formed by a placement order of blocks within the copy of the computer program, the method comprising:

receiving an identification of the blocks that comprise the signature; and for each of the identified blocks, determining the placement order of the block in the signed copy of the computer program, wherein the determined placement order uniquely identifies the signed copy of the computer program.

16. The method according to claim 15 wherein each block contains a block identifier and wherein the placement order is determined by reading the block identifier of each of the identified blocks.

17. A computer system for signature processing of an original computer program to generate identifiable copies of the computer program, the computer program having a multiplicity of ordered blocks of instructions, the multiplicity of blocks having a flow of execution, the computer system comprising:

selection means for selecting a plurality of signature blocks from among the multiplicity of ordered blocks of the original computer program;

a computing device in communication with the selection means, the computing device reordering the plurality of signature blocks to form a signed computer program, the reordered signature blocks forming a signature associated with the signed computer program;

a modifier means in communication with the computing device, the modifier means modifying the instructions within the reordered signature blocks to maintain the flow of execution of the original computer program; and a copying means for combining the reordered signature blocks as modified and the blocks of the computer program not selected as signature blocks to generate an identifiable copy of the computer program.

18. A computer system for placing an identifiable signature in a copy of a computer program having a plurality of code portions to generate an identifiable copy of the computer program comprising:

a selector for selecting a group of code portions having a flow of execution from among the plurality of code portions;

a signature generator for reordering the selected group of code portions to form the signature for the computer program; and a code portion linker for modifying the code portions within the reordered group of code portions in order to maintain the flow of execution; and a copy generator for combining the reordered group of code portions as modified and the code portions of the computer program not selected to generate an identifiable copy of the computer program.

19. The computer system of claim 18 wherein the flow of execution is indicated by exit instructions within each code portion and wherein the code portion linker further includes a modifier that adds branching instructions to code portions to maintain the flow of execution.

20. The computer system of claim 18 wherein the flow of execution is indicated by exit instructions within each code portion and wherein the code portion linker further includes a modifier that modifies the exit instructions to maintain the flow of execution.

21. The computer system of claim 18 wherein the flow of execution is indicated by exit instructions within each code portion and wherein the code portion linker further includes a modifier that deletes branching instructions to maintain the flow of execution.

22. The method according to claim 1 wherein the computer program is an executable module generated by compiling a source code module.

23. The method according to claim 1 wherein a unique signature is encoded into each copy of the computer program.

24. A computer-readable memory device for controlling a computer system to perform the method of claim 1.

25. The method according to claim 1 wherein the step of reordering the group of code portions includes randomly selecting an order for the code portions and then reordering the group of code portions based upon the randomly selected order.

26. The method according to claim 25, including ensuring that each randomly selected order is unique.

* * * * *